US007940306B2

(12) United States Patent
Okumura et al.

(10) Patent No.: US 7,940,306 B2
(45) Date of Patent: May 10, 2011

(54) CAMERA CAPABLE OF DISPLAYING MOVING IMAGE AND CONTROL METHOD OF THE SAME

(75) Inventors: Yoichiro Okumura, Hino (JP); Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 670 days.

(21) Appl. No.: 11/978,083

(22) Filed: Oct. 25, 2007

(65) Prior Publication Data

US 2008/0151065 A1    Jun. 26, 2008

(30) Foreign Application Priority Data

Dec. 20, 2006  (JP) ................................. 2006-343082

(51) Int. Cl.
  *H04N 5/228* (2006.01)
(52) U.S. Cl. ................. 348/208.12; 348/208.4
(58) Field of Classification Search ............... 348/208.4, 348/208.12
  See application file for complete search history.

(56) References Cited

U.S. PATENT DOCUMENTS

| | | | |
|---|---|---|---|
| 6,453,124 B2 | 9/2002 | Morimoto et al. | |
| 6,882,369 B1 | 4/2005 | Ito | |
| 7,375,905 B2 * | 5/2008 | Jin | 359/726 |
| 7,580,071 B2 * | 8/2009 | Uchiyama | 348/251 |
| 7,606,476 B2 * | 10/2009 | Toji | 396/53 |
| 7,693,405 B2 * | 4/2010 | Sakamoto et al. | 396/55 |
| 2001/0026683 A1 | 10/2001 | Morimoto et al. | |
| 2006/0176373 A1 * | 8/2006 | Ito et al. | 348/208.12 |
| 2010/0007747 A1 * | 1/2010 | Ito et al. | 348/208.12 |

FOREIGN PATENT DOCUMENTS

| | | |
|---|---|---|
| JP | 2001-166201 | 6/2001 |
| WO | WO 2006/126620 | 11/2006 |

OTHER PUBLICATIONS

First Notification of Office Action for Chinese Patent Application No. 200710169647.7, mailed Oct. 30, 2009 (5 pgs.) with translation (6 pgs.).

* cited by examiner

*Primary Examiner* — James M Hannett
(74) *Attorney, Agent, or Firm* — John C. Pokotylo; Straub & Pokotylo

(57) ABSTRACT

There is disclosed a camera capable of display a moving image, which executes auto focusing of a hill-climbing system while executing a blur correcting operation to reduce image blur generated by vibration applied to the camera. Examples of the blur correcting operation include a correcting operation by a mechanical blur correction mechanism which moves an image pickup device so as to cancel the vibration, and a correcting operation of electronic image blur correction to obtain a video signal which does not have any image blur from an output of the image pickup device by processing an image.

7 Claims, 8 Drawing Sheets

CAMERA CAPABLE OF DISPLAYING MOVING IMAGE AND CONTROL METHOD OF THE SAME

CROSS-REFERENCE TO RELATED APPLICATION

This application is based upon and claims the benefit of priority from prior Japanese Patent Application No. 2006-343082, filed on Dec. 20, 2006, the entire contents of which are incorporated herein by reference.

BACKGROUND OF THE INVENTION

1. Field of the Invention

The present invention relates to a camera in which subject image signals are repeatedly acquired by an image pickup device to enable the display of a moving image in a display device in response to the subject image signals.

2. Description of the Related Art

In these days, a digital camera usually has a so-called live view display function (hereinafter referred to also as an electronic view finder function) in which a subject image signal is repeatedly acquired by an image pickup device to display a moving image in a display device in response to the subject image signal.

In this case, there are many digital cameras also using an automatic focusing mechanism (hereinafter referred to also as contrast AF) of a so-called hill-climbing system in which a contrast signal is calculated from the subject image signal to move a photographing lens to a position where a value of this contrast signal is maximized.

BRIEF SUMMARY OF THE INVENTION

A camera of the present invention executes auto focusing (contrast AF) of a hill-climbing system while executing a blur correcting operation of reducing image blur generated by vibration applied to the camera.

One example of a constitution of the present invention can be described as follows. The present invention is directed to a camera configured to display a moving image, in which subject image signals are repeatedly acquired by an image pickup device to display the moving image in a display device in response to the subject image signals. The camera comprises a focusing portion which guides a photographing lens to a focal position based on the subject image signal at a time when a release button is half pressed during the display of the moving image and which acquires a contrast signal from the subject image signal to move the photographing lens to a position where a value of the contrast signal is maximized; and an image blur correcting portion which includes a vibration sensor to detect vibration applied to the camera and which reduces image blur generated by the vibration based on an output of the vibration sensor and which executes a blur correcting operation in parallel with a focusing operation of the focusing portion.

The present invention can be understood as the invention of a control method of a camera.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
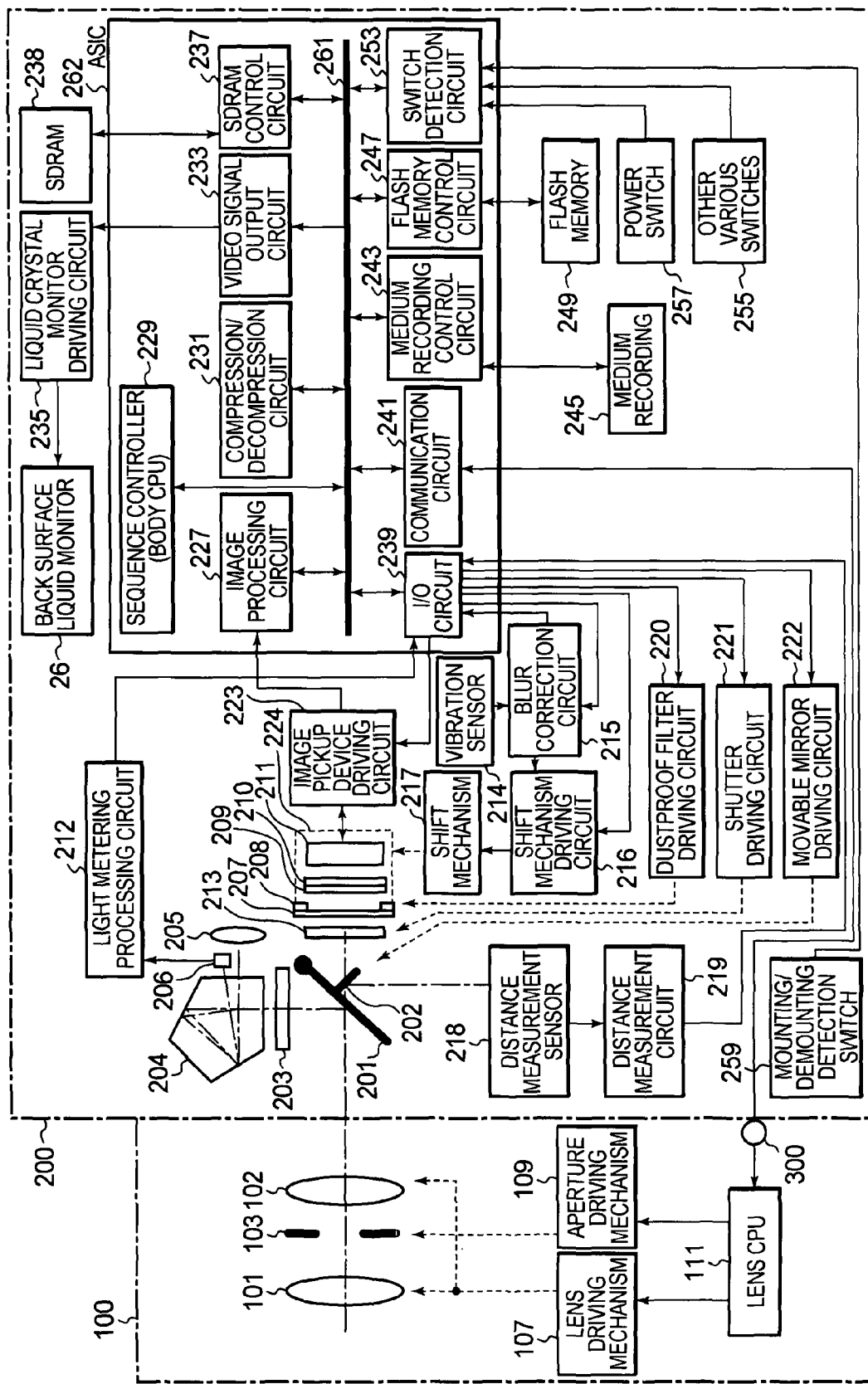
FIG. 1 is a block diagram showing the whole constitution of a digital single lens reflex camera according to a first embodiment of the present invention.

A preferable first embodiment will hereinafter be described in accordance with a digital single lens reflex camera to which the present invention is applied. FIG. 1 is a block diagram showing the whole constitution mainly including an electric system of the digital single lens reflex camera according to the first embodiment of the present invention. This digital camera has a so-called live view display function of forming a subject image formed by a photographing lens on an image pickup device to display a moving image in a display device such as a liquid crystal monitor for observation of the subject image based on an output of this image pickup device. Moreover, the camera can acquire a still image based on the output of the image pickup device in response to a photographing instruction from a camera user.

Furthermore, the present digital camera has a function of a mechanical blur correction mechanism which detects vibration applied to a camera main body to move the image pickup device so as to cancel this vibration, and a function of electronic blur correction to obtain an image signal which does not have any image blur from the output of the image pickup device by image processing.

The digital single lens reflex camera according to the present embodiment is constituted of an interchangeable lens 100 and a camera main body 200. In the present embodiment, the interchangeable lens 100 and the camera main body 200 are separately constituted, and electrically connected to each other via a communication contact 300, but the interchangeable lens 100 and the camera main body 200 may integrally be constituted.

In the interchangeable lens 100, lenses 101, 102 for focusing and focal length adjustment and an aperture 103 for adjusting an opening amount are arranged. The lenses 101, 102 are driven by a lens driving mechanism 107, and the aperture 103 is driven by an aperture driving mechanism 109. The lens driving mechanism 107 and the aperture driving mechanism 109 are connected to a lens CPU 111, respectively, and this lens CPU 111 is connected to the camera main body 200 via the communication contact 300. The lens CPU 111 controls the inside of the interchangeable lens 100, controls the lens driving mechanism 107 to perform auto focusing and zoom driving, and controls the aperture driving mechanism 109 to control an aperture value.

In the camera main body 200, a movable reflection mirror 201 is disposed between a position tilted as much as 45 degrees with respect to a lens optical axis in order to reflect a subject image to a finder optical system and a position where the mirror flips up in order to guide the subject image to an image pickup device 211. A focusing screen 203 for forming the subject image is arranged above this movable reflection mirror 201, and a penta prism 204 for horizontally reversing the subject image is arranged above this focusing screen 203. An eyepiece lens 205 for observing the subject image is arranged on an emission side (the right side in FIG. 1) of this penta prism 204, and a light metering sensor 206 is arranged by the side of this eyepiece lens at a position which does not disturb the observation of the subject image. This light metering sensor 206 is constituted of a multidivisional light metering element which divides the subject image to perform light metering. An output of the light metering sensor 206 is connected to a light metering processing circuit 212, and the light metering processing circuit 212 outputs a subject luminance signal corresponding to luminance of the subject based on the output of the light metering sensor 206.

The movable reflection mirror 201 in the vicinity of the center thereof is constituted of a half mirror, and a sub-mirror 202 for reflecting subject light transmitted through a half mirror portion to a lower part of the camera main body 200 is disposed on a back surface of this movable reflection mirror 201. This sub-mirror 202 is rotatable with respect to the movable reflection mirror 201. When the movable reflection mirror 201 flips up, the sub-mirror 202 rotates to such a position as to cover the half mirror portion. When the movable reflection mirror 201 is present at a subject image observing position, the sub-mirror is present at an open position with respect to the movable reflection mirror 201 as shown in the drawing. This movable reflection mirror 201 is driven by a movable mirror driving mechanism 222.

Moreover, a distance measurement sensor 218 is arranged under the sub-mirror 202, and an output of this distance measurement sensor 218 is connected to a distance measurement circuit 219. The distance measurement sensor 218 and the distance measurement circuit 219 can measure a defocus amount of the subject image formed by the lenses 101, 102. That is, the defocus amount is detected by distance measurement based on a known TTL phase-difference method by use of two luminous fluxes passed through peripheries of the lenses 101, 102.

A focal plane type of shutter 213 for controlling an exposure time is arranged behind the movable reflection mirror 201, and this shutter 213 is driven and controlled by a shutter driving mechanism 221. The image pickup device 211 is disposed behind the shutter 213, and photoelectrically converts the subject image formed by the lenses 101, 102 into an electric signal. It is to be noted that as the image pickup device 211, a two-dimensional image pickup device such as a charge coupled device (CCD) or a complementary metal oxide semiconductor (CMOS) may be used. A dustproof filter 207 and a piezoelectric element 208 secured to a peripheral edge portion of this dustproof filter 207, constituting a dust removal mechanism, are arranged between the shutter 213 and the image pickup device 211. This piezoelectric element 208 is driven by a dustproof filter driving circuit 220.

Between the dustproof filter 207 and the image pickup device 211, there are arranged an optical low pass filter 209 for cutting a high frequency component of the subject image to pass an only low frequency and an infrared cut-off filter 210 which cuts an infrared light component. These dustproof filter 207, piezoelectric element 208, optical low pass filter 209, infrared cut-off filter 210 and image pickup device 211 constitute an image pickup device unit 224. The gaps between the elements of this image pickup device unit 224 is constituted so narrow that dust and the likes do not easily invade the unit. The image pickup device unit 224 is movable by a shift mechanism 217 in a plane crossing the image pickup optical axis of the lenses 101, 102 constituting photographing lenses at right angle.

An output of a vibration sensor 214 as a sensor for detecting hand movement applied to the camera main body 200 is connected to a blur correction circuit 215. This blur correction circuit 215 inputs a control signal via an I/O circuit 239, and outputs a blur correction signal to a shift mechanism driving circuit 216 and the I/O circuit 239. The blur correction signal input into the I/O circuit 239 is sent to an image processing circuit 227 via a data bus 261.

Moreover, the shift mechanism 217 moves the image pickup device unit 224 with an actuator in the shift mechanism driving circuit 216 which inputs the blur correction signal. Therefore, based on the output of the vibration sensor 214, the blur correction circuit 215 outputs a driving signal to the shift mechanism driving circuit 216 so as to cancel movements of the hand shakes, and the shift mechanism 217 moves the image pickup device unit 224 with the actuator in the shift mechanism driving circuit 216. It is to be noted that the shift mechanism 217 can move the image pickup device unit 224 in a first direction in the plane crossing the image pickup optical axis at right angle and a second direction crossing this first direction at right angle. Details of the image pickup device unit 224, the shift mechanism 217 and the shift mechanism driving circuit 216 will be described later with reference to FIGS. 2 and 3.

The image pickup device 211 is connected to an image pickup device driving circuit 223, and driven and controlled in response to a control signal from the I/O circuit 239. The image pickup device driving circuit 223 amplifies and converts analog to digital (AD conversion) a photoelectric analog signal output from the image pickup device 211. The image pickup device driving circuit 223 is connected to the image processing circuit 227 in an application specific integrated circuit (ASIC) 262. This image processing circuit 227 performs various types of image processing such as digital amplification (digital gain adjustment processing) of digital image data, color correction, gamma ($\gamma$) correction, contrast correction, monochromatic-chromatic mode processing and live view image processing. The image processing circuit 227 also performs electronic blur correction to remove an influence of the vibration applied to the camera based on the blur correction signal by a known image processing such as changing a position of a part cut out from the AD converted image data.

The image processing circuit 227 is connected to the data bus 261. This data bus 261 is connected to the image processing circuit 227, and additionally to a sequence controller (hereinafter referred to as a "body CPU") 229 described later, a compression/decompression circuit 231, a video signal output circuit 233, an SDRAM control circuit 237, the I/O circuit 239, a communication circuit 241, a recording medium control circuit 243, a flash memory control circuit 247 and a switch detection circuit 253.

The body CPU 229 connected to the data bus 261 controls an operation of this digital camera. The compression/decompression circuit 231 connected to the data bus 261 is a circuit for compressing the image data stored in an SDRAM 238 in a compression form such as JPEG for a still image and for decompressing the data during image regeneration. It is to be noted that the image compression is not limited to JPEG, and another compression method is applicable. The video signal output circuit 233 connected to the data bus 261 is connected to a back surface liquid crystal monitor 26 via a liquid crystal monitor driving circuit 235. The video signal output circuit 233 is a circuit for converting the image data stored in the SDRAM 238 or a recording medium 245 into a video signal to be described in the back surface liquid crystal monitor 26.

The back surface liquid crystal monitor 26 is arranged on a back surface of the camera main body 200, but this position is not limited to the back surface as long as the camera user can observe the monitor. Moreover, the monitor is not limited to a liquid crystal, and another display device may be used. The SDRAM 238 is connected to the data bus 261 via the SDRAM control circuit 237. This SDRAM 238 is a buffer memory for temporarily storing the image data subjected to the image processing by the image processing circuit 227 or the image data compressed by the compression/decompression circuit 231. The I/O circuit 239 is connected to the light metering processing circuit 212, the blur correction circuit 215, the shift mechanism driving circuit 216, the distance measurement circuit 219, the dustproof filter driving circuit 220, the shutter driving mechanism 221, the movable mirror driving mechanism 222 and the image pickup device driving circuit 223. The I/O circuit 239 controls circuits such as the body CPU 229 and input/output of the data via the data bus 261. The communication circuit 241 connected to the lens CPU 111 via the communication contact 300 is connected to the data bus 261 to exchange data and communicate control commands with respect to the body CPU 229 and the like.

The recording medium control circuit 243 connected to the data bus 261 is connected to the recording medium 245 to control recording of the image data and the like in this recording medium 245. The recording medium 245 is constituted so that one of rewritable recording mediums such as xD picture card®, compact flash (registered trademark), SD memory card® and memory stick® can be attached, and the recording medium is detachably attached to the camera main body 200. In addition, it may be constituted that a hard disk unit such as micro drive® and a radio communication unit can be connected.

The flash memory control circuit 247 connected to the data bus 261 is connected to a flash memory 249, and a program for controlling a flow of the camera is stored in this flash memory 249. The body CPU 229 controls the digital camera according to the program stored in this flash memory 249. It is to be noted that the flash memory 249 is an electrically rewritable nonvolatile memory.

A power switch 257 turns on/off in response to the operation of a power switch lever for controlling power supply to the camera main body 200. The power switch 257 and the interchangeable lens 100, and various switches 255 such as a mounting/demounting detection switch 259 are connected to the data bus 261 via the switch detection circuit 253. The various switches 255 include a switch which cooperates with a shutter release button, a switch which cooperates with a regeneration button to instruct a regeneration mode, a switch which cooperates with a cross button to instruct movement of a cursor in a screen of the back surface liquid crystal monitor 26, a switch which cooperates with a display switch button to switch a state to a live view display state, a switch which cooperates with a mode dial to instruct a photographing mode, an OK switch which cooperates with an OK button to determine selected modes or the like, and a dust removal switch.

It is to be noted that the release button has a first release switch which turns on when half pressed by the camera user and a second release switch which turns on when fully pressed. When this first release switch (hereinafter referred to as 1R) turns on, the camera performs photographing preparatory operations such as focus detection, focusing of the photographing lens, and the light metering of the subject luminance. When the second release switch (hereinafter referred to as 2R) turns on, the camera executes a photographing operation to capture the image data of the subject image based on an output of the image pickup device. The dust removal switch is a switch which cooperates with the dust removal button to operate in a case where the camera user instructs a dust removal operation. The mounting/demounting detection switch 259 is a switch which detects whether or not the interchangeable lens 100 is mounted on the camera main body 200.

Figure 2A:
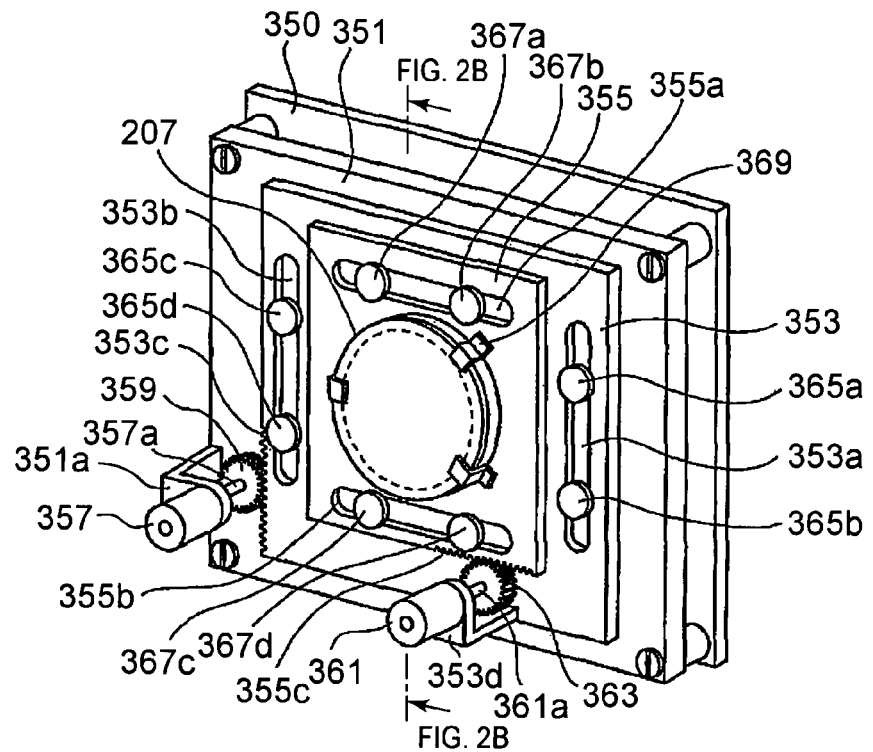
FIG. 2A is an appearance perspective view showing constitutions of an image pickup device unit and a shift mechanism according to the first embodiment of the present invention.
Figure 2B:
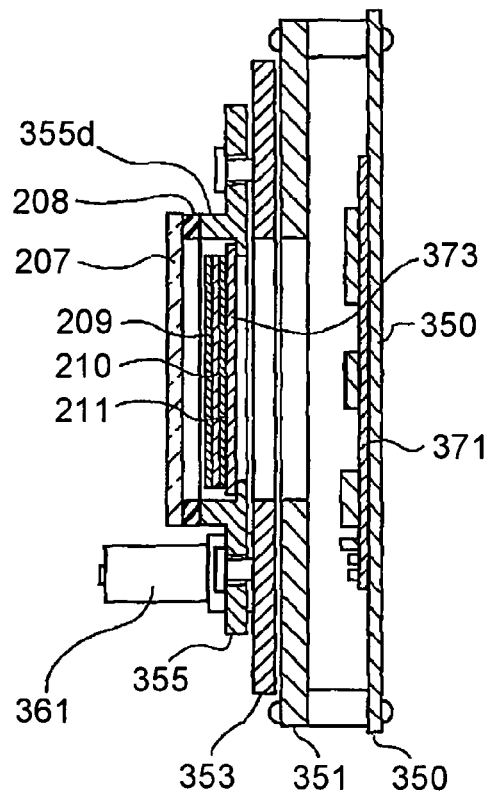
FIG. 2B is a sectional view cut along a cutting line of FIG. 2A.

Next, constitutions of the image pickup device unit 224 and the shift mechanism 217 will be described with reference to FIGS. 2A and 2B. FIG. 2A is a perspective view of the image pickup device unit 224 and the shift mechanism 217 as viewed from a shutter 213 side, and FIG. 2B is a sectional view cut along a cutting line.

A first substrate 350 constituted of a hard electric circuit substrate of a flat plate is fixed to the camera main body 200. A main substrate 371 on which a control system circuit such as the ASIC 262 is mounted is fixed to the first substrate 350.

A second substrate 351 constituted of the flat plate is fixed to a front surface side of the first substrate 350 in parallel with the first substrate 350. On the second substrate 351, four pins 365a, 365b, 365c and 365d are planted. These four pins 365a, 365b, 365c and 365d are fitted into elongated holes 353a, 353b of a first slider 353, and the first slider 353 is slidable in a vertical direction. That is, the pins 365a and 365b arranged in the vertical direction are fitted into the elongated hole 353a, and the pins 365c and 365d similarly arranged in the vertical direction are fitted into the elongated hole 353b. The first slider 353 is slidable in the vertical direction, and does not slide in a horizontal direction.

On the first slider 353, four pins 367a, 367b, 367c and 367d are planted. These four pins 367a, 367b, 367c and 367d are fitted into elongated holes 355a, 355b of a second slider 355, and the slider is slidable in the horizontal direction. That is, the pins 367a and 367b arranged in the horizontal direction are fitted into the elongated hole 355a, and the pins 367c and 367d similarly arranged in the horizontal direction are fitted into the elongated hole 355b. The second slider 355 is slidable in the horizontal direction, and does not slide in the vertical direction.

A DC motor (hereinafter referred to as the motor) 357 as an actuator for Y-direction shift is fixed to an L-shaped protruding portion 351a around a left side of the second substrate 351, and a driving shaft 357a of the motor 357 is integrally secured to a driving gear 359. This driving gear 359 is meshed with a plain gear 353c formed at a side wall of a left side portion of the first slider 353, and the driving gear 359 and the plain gear 353c constitute a so-called rack and pinion. Therefore, when the motor 357 rotates, the driving gear 359 rotates, and the first slider 353 meshed with the driving gear slides in the vertical direction. It is to be noted that in FIG. 2, the only driving gear 359 is drawn as a gear in a driving force transmission system of the motor 357, but needless to say, a plurality of gear rows may be disposed in order to reduce a speed of the rotation of the motor 357.

A DC motor (hereinafter referred to as the motor) 361 as an actuator for X-direction shift is fixed to an L-shaped protruding portion 353d disposed at the first slider 353, and a driving shaft 361a of the motor 361 is integrally secured to a driving gear 363. This driving gear 363 is meshed with a plain gear 355c formed at a side wall of a lower side portion of the second slider 355, and the driving gear 363 and the plain gear 355c constitute a so-called rack and pinion. Therefore, when the motor 361 rotates, the driving gear 363 rotates, and the second slider 355 meshed with the driving gear slides in the horizontal direction. It is to be noted that in the same manner as in the driving in the vertical direction, in FIG. 2A, the only driving gear 363 is drawn as a gear in a driving force transmission system of the motor 361, but needless to say, a plurality of gear rows may be disposed in order to reduce a speed of the rotation of the motor 361.

An image pickup substrate 373 is disposed on an inner side of an opening substantially at the center of the second slider 355. The image pickup device 211 is fixed to this image pickup substrate 373, the infrared cut-off filter 210 is arranged on the side of a front surface of the image pickup device, and the optical low pass filter 209 is further arranged on the side of a front surface of the infrared cut-off filter. Moreover, at an attachment portion 355d of a peripheral edge portion of the opening of the second slider 355, the piezoelectric element 208 is secured along a circumference of the opening. Furthermore, the dustproof filter 207 is arranged via a vibration transmission member (not shown). The dustproof filter 207 is brought in press contact with the piezoelectric element 208 via the vibration transmission member with clasps 369. The subject image formed by the lenses 101, 102 passes through the dustproof filter 207, the optical low pass filter 209 and the infrared cut-off filter 210 to be focused on the image pickup device 211.

The image pickup device unit 224 and the shift mechanism 217 are constituted in this manner. Therefore, when the motor 357 rotates, the first slider 353 is slidable in the vertical direction (Y-direction) on the second substrate 351. Similarly, when the motor 361 rotates, the second slider 355 is slidable in the horizontal direction (X-direction) on the first slider 353. That is, the motors 357 and 361 are driven and controlled, respectively, whereby the second slider 355 to which the image pickup device 211 is fixed can freely move in the X-direction and the Y-direction in the plane crossing the photographing optical axis at right angle. Therefore, based on the output of the vibration sensor 214, the blur correction circuit 215 outputs signals to the motors 357 and 361 of the shift mechanism driving circuit 216 so as to cancel the hand movements, so that the image pickup device 211 can spatially be moved to cancel the hand movements (mechanical blur correction).

Moreover, on receiving a driving signal from the dustproof filter driving circuit 220, the piezoelectric element 208 vibrates at a frequency higher than an audible frequency to generate vibration waves, so that dust attached to the dustproof filter 207 can be removed.

It is to be noted that in the present embodiment, the driving ranges of the first slider 353 and the second slider 355 are determined by the elongated holes 353a, 353b, 355a and 355b and the pins 365a, 365b, 365c, 365d, 367a, 367b, 367c and 367d. However, possible driving ranges are not limited to the constitutions of the elongated holes and the pins. For example, the second substrate 351 and the first slider 353 may be provided with abutment portions, and the first slider 353 and the second slider 355 may be provided with abutment portions, so that the sliders move between the portions. In this case, if a movable member such as the first slider 353 is provided with an abutment portion, a driving mechanism might adversely be affected, and it is therefore preferable to dispose the abutment portion on a fixed member.

Moreover, in the present embodiment, the DC motor 361 is disposed as the actuator for the X-direction shift, and the DC motor 357 is disposed as the actuator for the Y-direction shift, but the present invention is not limited to this embodiment, and a stepping motor or an ultrasonic motor may be adopted. When the stepping motor is adopted, there is an advantage that the number of applied pulses can be counted to detect a position moved from a reference position. The first slider 353 and the second slider 355 have such directions that the sliders cross each other at right angles, but the present invention is not limited to this embodiment, and it may be constituted that the sliders mutually move along a circular shape. Furthermore, rack and pinion are used as the shift mechanism 217 of the image pickup device 211, but the present invention is not limited to this embodiment, and various constitutions such as a shift mechanism using a piezoelectric element may be used.

Figure 3:
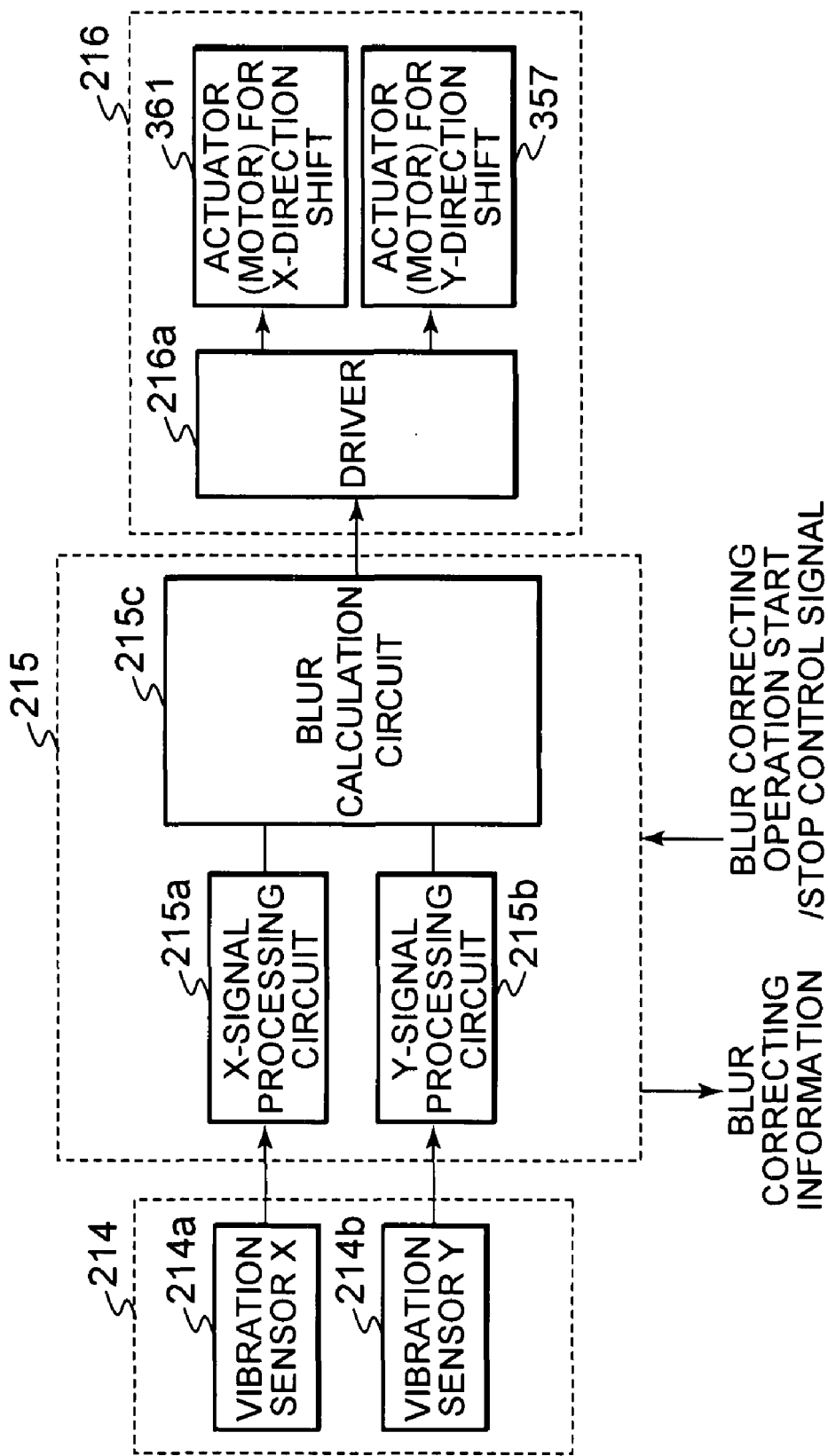
FIG. 3 is a block diagram showing a circuit constitution of a vibration sensor, a blur correcting circuit and a shift mechanism driving circuit according to the first embodiment of the present invention.

Next, constitutions of the vibration sensor 214, the blur correction circuit 215 and the shift mechanism driving circuit 216 according to the present embodiment will be described with reference to FIG. 3. The vibration sensor 214 is constituted of a vibration sensor X 214a which detects the hand movement of a longitudinal direction (the X-direction) of the camera main body 200 as a first direction, and a vibration sensor Y 214b which detects the hand movement of a height direction (the Y-direction) of the camera main body 200 as a second direction. Here, each of the vibration sensor is constituted of a known gyro, an angular speed sensor, an acceleration sensor, a shock sensor or the like.

The blur correction circuit 215 is constituted of an X-signal processing circuit 215a, a Y-signal processing circuit 215b, and a blur calculation circuit 215c connected to outputs of these circuits. The X-signal processing circuit 215a is connected so as to input an output of the vibration sensor X 214a, and processes a signal concerning the hand movement in an X-axis direction to output the signal to the blur calculation circuit 215c. The Y-signal processing circuit 215b is connected so as to input an output of the vibration sensor Y 214b, and processes a signal concerning the hand movement in a Y-axis direction to output the signal to the blur calculation circuit 215c. The blur calculation circuit 215c calculates a driving amount required for canceling the hand movement in the X-axis direction and the Y-axis direction, respectively, to output the amount to the shift mechanism driving circuit 216.

The shift mechanism driving circuit 216 has a driver 216a, the motor 361 as the actuator for the X-direction shift, and the motor 357 as the actuator for the Y-direction shift. These actuators correspond to the motors 361 and 357 of FIG. 2. The actuator 361 for the X-direction shift and the actuator 357 for the Y-direction shift are driven based on an output from the driver 216a, respectively.

The driver 216a is connected so as to input an output of the blur calculation circuit 215c of the blur correction circuit 215. Then, the driver 216a drives and controls the actuator 361 for the X-direction shift and the actuator 357 for the Y-direction shift based on the output of the blur correction circuit 215, whereby a blur correcting operation is performed.

A blur correcting operation start/stop control signal output from the body CPU 229 via the I/O circuit 239 is applied to the blur correction circuit 215, and start and stop of the blur correction signal are controlled in response to this control signal. Moreover, when the start of the blur correcting operation is controlled, the blur correction circuit 215 outputs a control signal to the driver 216a of the shift mechanism driving circuit 216. Furthermore, blur correcting information based on the blur correction signal is output to the image processing circuit 227 via the I/O circuit 239 in order to perform an electronic blur correcting operation. It is to be noted that in the present embodiment, the image pickup device 211 is moved based on the output of the vibration sensor 214 for detecting the hand movement, but the present invention is not limited to this embodiment, and needless to say, a part of the photographing lens may be moved to cancel the vibration due to the hand movement.

Figure 4:
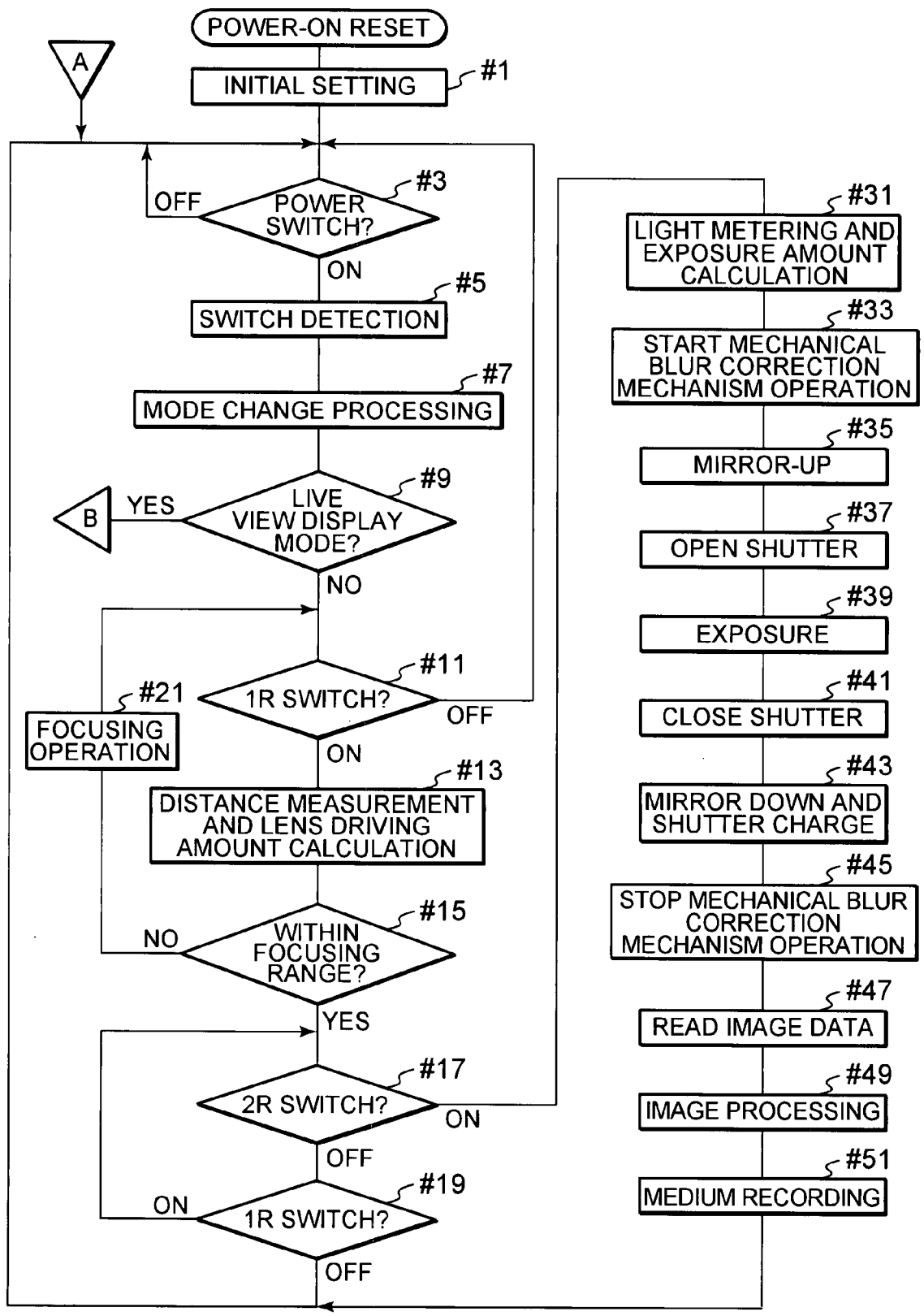
FIG. 4 is a flow chart of power-on reset according to the first embodiment of the present invention.

Next, an operation of the digital single lens reflex camera according to the first embodiment will be described with reference to flow charts of FIGS. 4 to 6. First, when power-on reset is performed by mounting a power battery on the camera main body 200 or the like, initial setting (#1) is performed. In the initial setting, a reset operation is performed so as to initialize ports and memories of electronic devices and set mechanical components to initial positions. Subsequently, a state of the power switch 257 is detected (#3). As a result of detection, in a case where the power switch 257 has an off-state, a standby state is achieved in which this step #3 is repeatedly executed.

As a result of the detection at the step #3, when the power switch 257 has an on-state, states of the various switches 255 including the 1R switch, the 2R switch, a photographing mode switch and a menu switch and the mounting/demounting detection switch 259 are detected by the switch detection circuit 253 (#5). Subsequently, mode change processing of a photographing mode, an image quality mode and the like is performed based on the states of the photographing mode switch and the menu switch obtained by the switch detection (#7).

Subsequently, based on the state of a switch cooperating with the display switch button, which has been obtained in the switch detection of the step #5, it is judged whether or not a mode is a live view display mode (#9). As a result of the judgment, when the live view display mode is set, the processing advances to step #53 shown in FIG. 5 in order to switch from subject image observation with an optical finder to subject image observation by the live view display with the back surface liquid crystal monitor 26, and details of the step will be described later.

As a result of the judgment at the step #9, when the mode is not the live view display mode, the state of the 1R switch is judged based on the detection result obtained by the switch detection of the step #5. As a result of the judgment, when the 1R switch is turned off, the processing returns to the step #3 to repeat the above-mentioned step.

When the 1R switch is turned on in step #11, that is, the camera user half presses the release button, distance measurement and lens driving amount calculation are performed. First, defocus amounts of the lenses 101, 102 constituting the photographing lens is detected by a known TTL phase-difference method based on outputs from the distance measurement sensor 218 and the distance measurement circuit 219, and a lens driving amount for driving the lens to a focal position is obtained by calculation (#13). Subsequently, it is judged based on the defocus amount or the lens driving amount whether or not the lens enters a focusing range (#15).

As a result of the judgment, when the lens does not enter the focusing range, the lens driving amount obtained in the step #13 is transmitted to the lens CPU 111, and the lens driving mechanism 107 is controlled to drive the photographing lens at the focusing position (#21).

When one cycle of a focusing operation ends, the processing advances to the step #11 to repeat the above-mentioned steps. Therefore, in a state (a photographing preparatory state) in which the live view display mode is not selected (i.e., an optical finder observation mode is selected) and the release button is half pressed, the distance measurement by the TTL phase-difference method and focal driving are performed until a focused state is reached. In this step, the subject image is observed with the optical finder, and any blur correcting operation (vibration preventing operation) is not performed.

In the step #15, as a result of the judgment, when the lens enters the focusing range, the state of the 2R switch is detected (#17). When the 2R switch is turned off, that is, when the camera user does not fully press the release button, the state of the 1R switch is successively detected (#19). When the 1R switch is turned on, the processing returns to the step #17. When the 1R switch is turned off, the processing returns to the step #3 to repeat the above-mentioned steps. That is, in a case where the release button is half pressed, a standby state is obtained in which the steps #17 and #19 of repeatedly detecting the states are performed. When the camera user releases the release button, the processing returns to the step #3.

In this manner, according to the present embodiment, in a case where the release button is half pressed and the 1R switch is turned on, in the step #13, auto focusing by the TTL phase-difference method is performed, but any blur correcting operation is not performed. In this state, the subject image is observed with the optical finder, especially defocusing due to the hand movement is not very conspicuous, the power battery is largely consumed during driving of the mechanical blur correction mechanism, and more power consumption than necessary is to be suppressed.

In a case where it is judged in the step #17 that the 2R switch is turned on, the operation shifts to an image pickup operation of recording the still image based on the output of the image pickup device 211. When the image pickup operation is started, first the light metering and exposure amount calculation are performed (#31). In this step, subject luminance is measured based on an output of the light metering sensor 206, and the exposure amount calculation is performed to obtain a shutter speed and/or an aperture value by calculation based on the subject luminance obtained here.

Subsequently, the blur correcting operation is started with the blur correction mechanism in order to prevent the subject image from being blurred owing to the hand movement (#33). To start this blur correcting operation, a blur correcting operation start signal is transmitted to the blur correction circuit 215 (see FIG. 3) via the I/O circuit 239. In consequence, the motors 357, 361 of the shift mechanism driving circuit 216 drive the image pickup device 211 so as to cancel the hand movement.

Then, a mirror-up operation of the movable reflection mirror 201 is performed (#35). Before the movable reflection mirror 201 is turned up (i.e., in a down state), a subject luminous flux passed through the lenses 101, 102 of the photographing lens is reflected by the movable reflection mirror 201, and forms an image on the focusing screen 203, so that the subject image can be observed with the optical finder. In this state, the subject luminous flux is not guided to the image pickup device 211. The movable reflection mirror 201 is turned up, so that the subject luminous flux can be guided to the image pickup device 211. Subsequently, a front curtain of the shutter 213 starts running, and the shutter 213 is opened (#37). In consequence, the subject image is formed on the image pickup device 211, and exposure is started (#39).

When an exposure time elapses based on a shutter speed set in accordance with the photographing mode set in the step #7 or the shutter speed calculated in the step #31, a rear curtain of the shutter 213 is run to close the shutter (#41). Subsequently, a mirror-down operation of the movable reflection mirror 201 and a charging operation of the shutter 213 are performed (#43). Since the exposure operation ends in this manner, the operation of the mechanical blur correction mechanism is stopped (#45).

In the present embodiment, during the image pickup operation at a time when the subject image is observed with the finder optical system, in the steps #33 to #45 before through after an operation of acquiring the image data, the mechanical blur correction mechanism constituted of the shift mechanism 217, the shift mechanism driving circuit 216, the blur correction circuit 215 and the vibration sensor 214 drives the image pickup device 211 so as to cancel an influence of the vibration applied to the camera main body 200. It is to be noted that the blur correction mechanism may operate before and after the exposure operation of the step #39. For example, the blur correcting operation may be started before the light metering and the exposure calculation, or may be stopped after recording in a medium described later.

Subsequently, the image data is read from the image pickup device 211 (#47), the image is processed by the image processing circuit 227 or the like (#49), and the still image is recorded in the recording medium 245 (#51). When the recording of the still image ends, the processing returns to the step #3 to repeat the above-mentioned steps. In a case where the subject image is observed with the optical finder in the above step, when the camera user fully presses the release button, the image data obtained by the image pickup device 211 is recorded in the recording medium 245.

Figure 5:
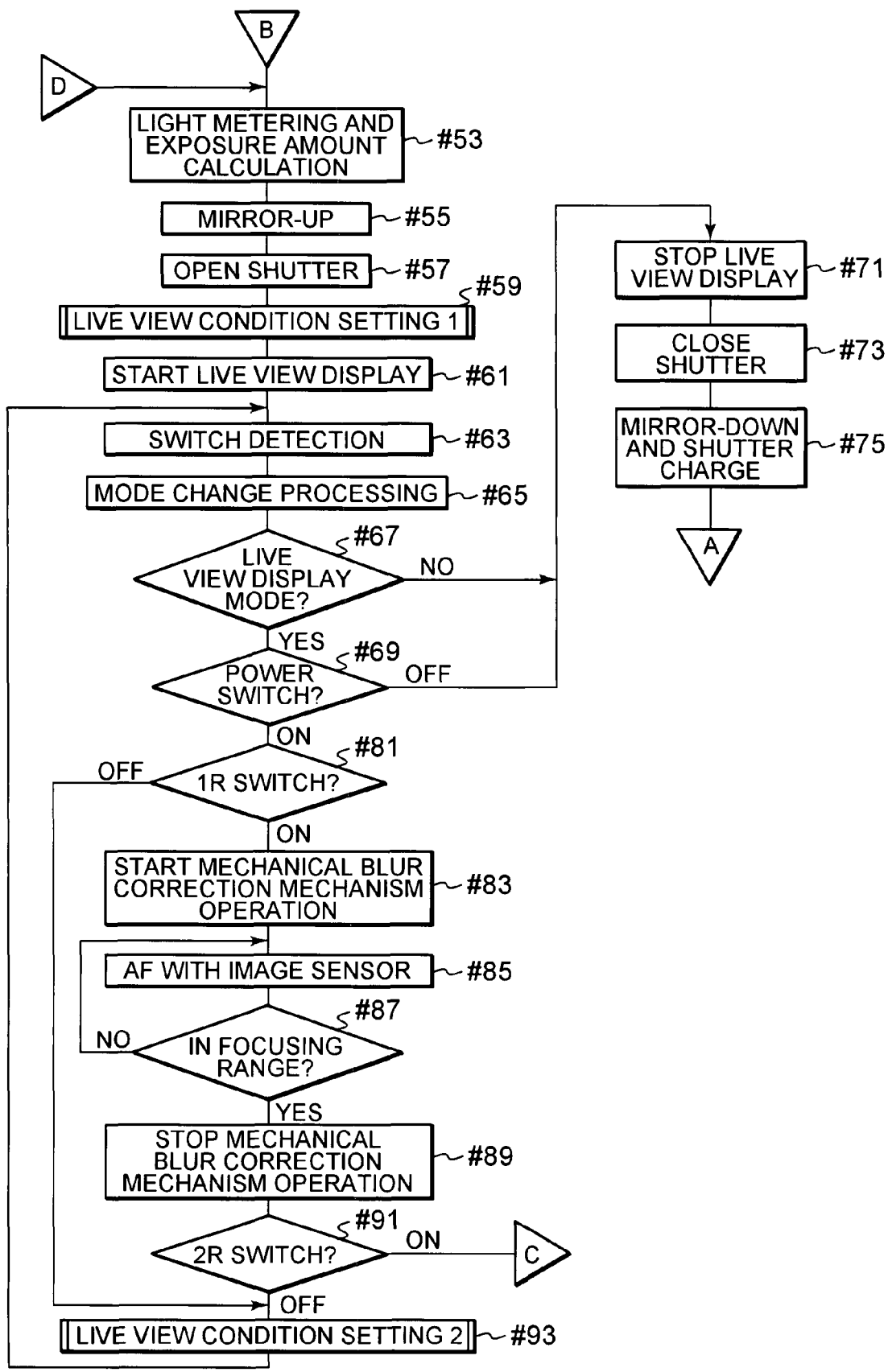
FIG. 5 is a flow chart of the power-on reset according to the first embodiment of the present invention.
Figure 6:
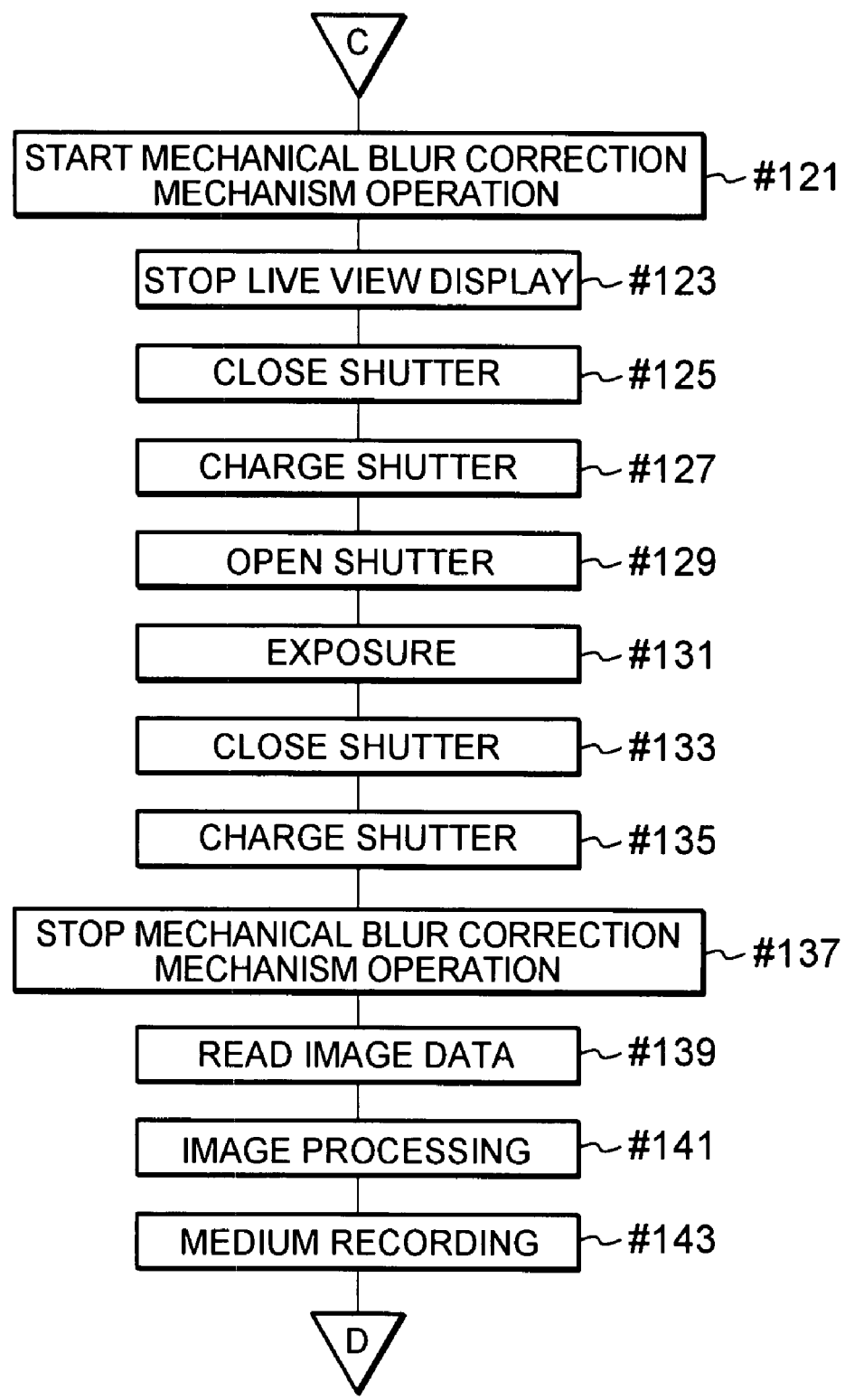
FIG. 6 is a flow chart of the power-on reset according to the first embodiment of the present invention.

In addition, when the live view display mode is selected by an operation of a display switch button in the step #9, the processing advances to step #53 of FIG. 5, and light metering and exposure amount calculation are performed in the same manner as in the step #31 (#53). Subsequently, in the same manner as in the step #35, a mirror-up operation of the movable reflection mirror 201 is performed (#55). When the mirror-up operation ends, the shutter 213 is opened in the same manner as in the step #37 (#57). In consequence, since the movable reflection mirror 201 is retracted from the photographing optical axis and the shutter 213 is opened, the subject image is formed on the image pickup device 211.

Afterward, a sub-routine of live view condition setting 1 is executed using results of the light metering and the exposure amount calculation, which have been obtained in the step #53, in order to set conditions of electronic shutter speed and sensitivity for driving the image pickup device 211 (#59). This sub-routine can be executed to display an image having an appropriate brightness (luminosity) in the back surface liquid crystal monitor 26. When the live view condition setting 1 ends, preparations for the live view display are made, and therefore the live view display of a moving subject image is started in the back surface liquid crystal monitor 26 (#61). In the present embodiment, a frame rate of the live view display is 30 frames per sec (fps), and a frame interval is 33 msec. It is to be noted that the image processing circuit 227 receives a start instruction of a live view display operation to control the operation.

Subsequently, switch detection is performed in the same manner as in the step #5 (#63), and mode change processing is performed in the same manner as in the step #7 (#65). Based on a state of the display changeover switch, which has been obtained during the switch detection, it is judged whether or not the mode is the live view display mode (#67). When the mode is not the live view display mode, step #71 and the subsequent steps are executed in order to cancel the live view display mode and display the subject image in the optical finder.

First, the live view display in the back surface liquid crystal monitor 26 is stopped (#71), and subsequently the shutter 213 is closed in the same manner as in the step #41 (#73). In consequence, the subject image is not guided onto the image pickup device 211. Subsequently, the movable reflection mirror 201 is turned down, and the shutter 213 is charged (#75). The live view display is stopped by this series of operations, and the processing returns to the step #3 to repeat the above-mentioned steps.

As a result of the judgment in the step #67, when the live view display mode is selected, the state of the power switch 257 is next detected (#69). As a result of the detection, when the power switch is turned off, the processing advances to the step #71 and the subsequent steps to cancel the live view display, and returns to the step #3.

In a case where it is detected in the step #69 that the power switch 257 is turned on, it is judged whether or not the release button is half pressed, that is, the 1R switch is turned on (#81). In a case where it is judged that the power switch is turned on, the operation of the mechanical blur correction mechanism is started (#83). In consequence, the shift mechanism 217 drives the image pickup device 211 so as to cancel the hand movement based on the detection result of the vibration sensor 214.

Subsequently, focusing of the lenses 101, 102 is automatically performed based on the output of the image pickup device 211 (#83). When the live view display mode is not selected, the movable reflection mirror 201 is turned down, and the subject luminous flux passed through the interchangeable lens 100 enters the distance measurement sensor 218 via the sub-mirror 202. Therefore, in a non-live view display mode, defocus amounts of the lenses 101, 102 can be detected by the TTL phase-difference method.

However, during the live view display, since the movable reflection mirror 201 is turned up, the distance measurement cannot be performed by the TTL phase-difference method. Instead, during the live view display, since the subject luminous flux enters the image pickup device 211, focusing (contrast AF) of a so-called hill-climbing system can be performed. During this focusing, a high frequency component is extracted from the output of the image pickup device 211, and the lenses 101, 102 are automatically adjusted by the lens driving mechanism 107 via the lens CPU 111 so as to maximize this high frequency component (i.e., a contrast value is maximized).

Subsequently, it is judged whether or not the lens is in the focusing range as a result of the focusing in the step #83 (#87). In a case where it is judged that the lens is not in the focusing range, the processing returns to the step #85 to perform the auto focusing. In a case where it is judged that the lens enters the focusing range, the mechanical blur correction mechanism operation which has been started in the step #83 is stopped (#89). Thus, in a case where the live view display is being performed (#67) and the release button is half pressed to achieve a photographing preparatory state (#81), the blur correcting operation is executed.

As described above, in the photographing preparatory stage of the present embodiment, in a case where the live view is not displayed and the distance measurement is performed by the phase difference method, the blur correcting operation is prohibited. On the other hand, in a case where the live view is displayed and the auto focusing is performed by a contrast process, the blur correcting operation is performed. When the blur correcting operation is performed, a subject (a target) can strictly be captured during the auto focusing operation by the contrast process. Furthermore, since the high frequency component can be extracted from the still subject image, the auto focusing can precisely be performed.

When the mechanical blur correction mechanism operation is stopped in the step #89, the state of the 2R switch is detected (#91). In a case where it is resultantly detected that the switch is turned off, or it is detected in the step #81 that the 1R switch is turned off, live view condition setting 2 is executed (#93). This live view condition setting 2 is a sub-routine having a purpose of keeping appropriate brightness of the live view display in the back surface liquid crystal monitor 26. Since the live view condition setting 1 of the step #59 is performed before the live view display, the setting is performed based on the output of the light metering sensor 206. However, in the live view condition setting 2, the electronic shutter speed and sensitivity during the next image pickup are determined based on a difference between targeted brightness and screen brightness as the previous image pickup result. It is to be noted that here the brightness is, for example, a value corresponding to a weighed average value of pixel outputs of the image pickup device 211. When the sub-routine of the live view condition setting 2 ends, the processing returns to the step #63 to repeat the above-mentioned steps.

In a case where it is detected in the step #91 that the 2R switch is turned on during the live view display, the operation shifts to an image pickup operation of recording the still image based on the output of the image pickup device 211. When the image pickup operation starts, first the operation of the mechanical blur correction mechanism is started in the same manner as in the step #33 (#121). This prevents that the image blurs owing to the hand movement during a photographing operation and that the image becomes visually undesirable. Subsequently, the live view display is stopped (#123), and an operation of closing the shutter 213 (#125) and a charging operation (#127) are performed. The shutter 213 is opened during the live view display, but the shutter 213 to control the exposure time is once closed and charged before entering the exposure operation, whereby the shutter 213 is initialized, and the exposure time can be controlled.

Subsequently, the running of the shutter front curtain of the shutter 213 is started to open the shutter (#129). In consequence, the subject image is formed on the image pickup device 211, and the exposure is started (#131). When the exposure time elapses based on the shutter speed set in accordance with the photographing mode set in the steps #7, #65 or the shutter speed calculated in the step #53, the rear curtain of the shutter 213 is run to close the shutter (#133). Subsequently, the shutter 213 is charged (#135). Since the movable reflection mirror 201 may be kept in turned up position in the live view display mode, unlike the step #43, a mirror-down operation is not performed. It is to be noted that in a different type of camera such that the movable reflection mirror 201 and the shutter 213 cannot be driven independently, the mirror-down operation may be performed here.

When the charging of the shutter ends, the operation of the mechanical blur correction mechanism is stopped (#137), the image data is read (#139), the image is processed (#141) and the image is recorded in a medium (#143). Since these steps are similar to the steps #45, #47, #49 and #51, the description of details are omitted. When the medium recording ends, the processing returns to the step #53, and the operation is performed in the live view display mode.

As described above, according to the first embodiment of the present invention, when the live view display is not selected, the blur correcting operation is prohibited at a photographing preparatory stage. Only when the live view display is selected and the photographing preparatory operation is started, the blur correcting operation is performed. When the live view is not displayed, the subject image is observed with the optical finder. Therefore, since precise focusing display is unnecessary, the operation of the blur correction mechanism is prohibited to suppress consumption of the power battery. When the live view display is selected, the blur correction mechanism is operated in order to precisely perform the focusing.

Moreover, generally in the blur correcting operation, the power battery is largely consumed. However, in the present embodiment, even when the live view display is selected, the blur correcting operation is not instantly started. When the release button is half pressed and the photographing preparatory state is achieved, the blur correcting operation is started. Therefore, the consumption of the power battery can be minimized. Furthermore, even in a case where the blur correcting operation is performed, when the focusing operation ends, the blur correcting operation is ended (#89), and the consumption of the power battery can further be suppressed.

Furthermore, in the present embodiment, when the 1R switch turns on during the live view display, the focusing operation is performed in the contrast process using the output of the image pickup device 211. In a case where the live view display is not selected, when the 1R switch turns on, the focused state is detected by the phase difference process based on the output of the distance measurement sensor 218, and the focusing operation is performed.

It is to be noted that in the present embodiment, the blur correction circuit 215 outputs blur correcting information from the I/O circuit 239 to the image processing circuit 227, but the output may be omitted, because any electronic blur correcting operation is not performed in the present embodiment.

Moreover, when the 1R switch turns on, that is, when the photographing preparatory operation is started, the blur correction mechanism starts the operation, but the present invention is not limited to this embodiment. For example, the operation may be started when entering the live view display mode, and the timing may appropriately be selected in this manner. Similarly, a timing to stop the operation of the blur correction mechanism is not limited to a time to complete the focusing operation. For example, the timing may be a time when the 1R switch turns off, and can appropriately be selected in this manner.

Next, a second embodiment of the present invention will be described with reference to FIGS. 7 and 8. In the first embodiment, as a blur correction device, the mechanical blur correction mechanism constituted of the vibration sensor 214, the blur correction circuit 215, the shift mechanism driving circuit 216, the shift mechanism 217 and the like performs the blur correcting operation. In the second embodiment, as the blur correction device, an electronic blur correcting portion constituted of a vibration sensor 214, a blur correction circuit 215, an image processing circuit 227 and the like performs blur correction. In the electronic blur correction, a cutout position of image data based on an output of an image pickup device 211 is changed based on the output of the vibration sensor 214 to obtain an image from which hand movement has been removed. The correction is performed by the image processing circuit 227 and the like.

Figure 8:
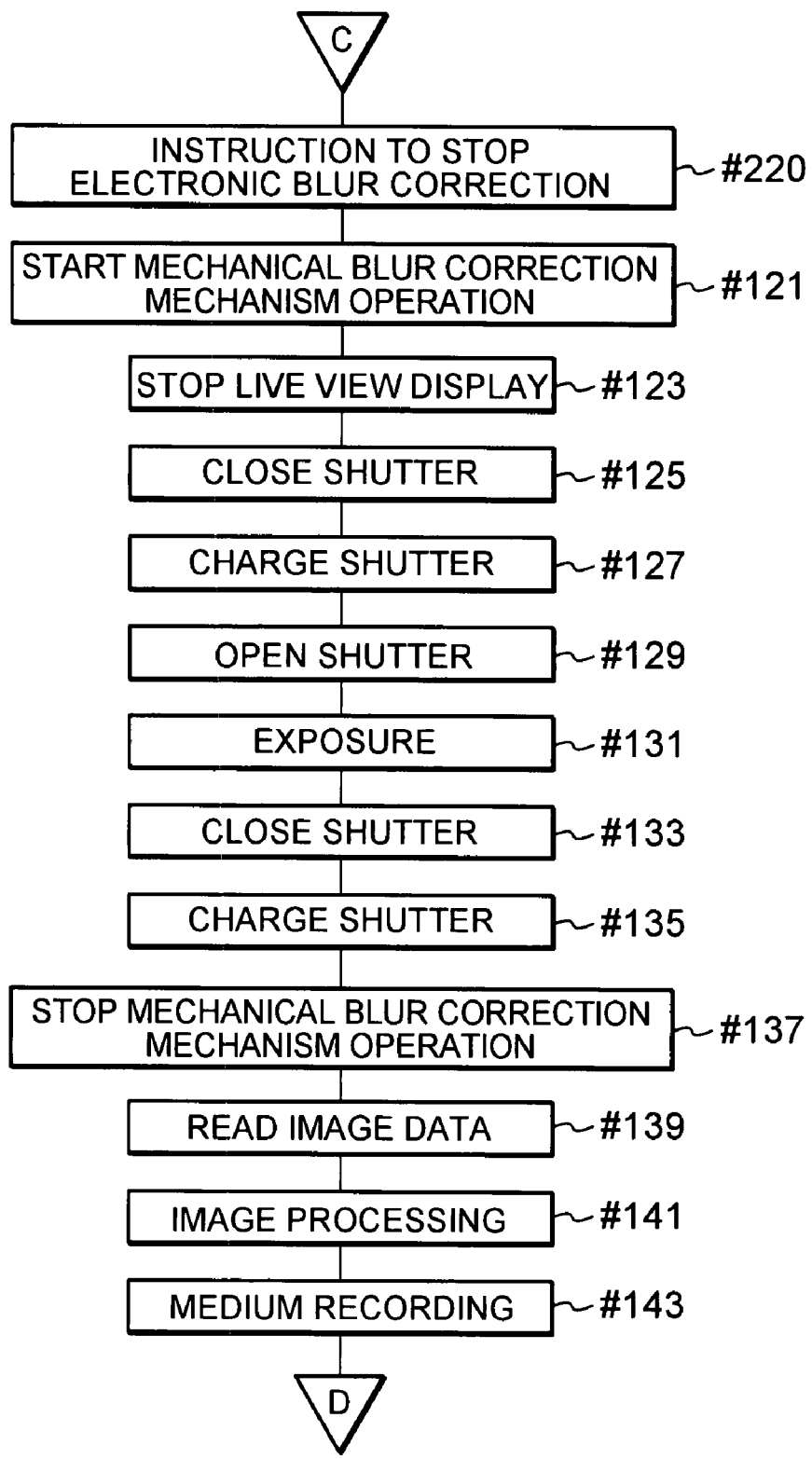
FIG. 8 is a flow chart of the power-on reset according to the second embodiment of the present invention.

This second embodiment has a constitution similar to that of the first embodiment except that the steps #83 and #89 are removed from the flow chart shown in FIG. 5, steps #251, #252 and #277 are added to a flow chart of FIG. 8, and step #220 is added to a flow chart of FIG. 9. Therefore, description of the same part is omitted, and different respects will mainly be described.

Figure 7:
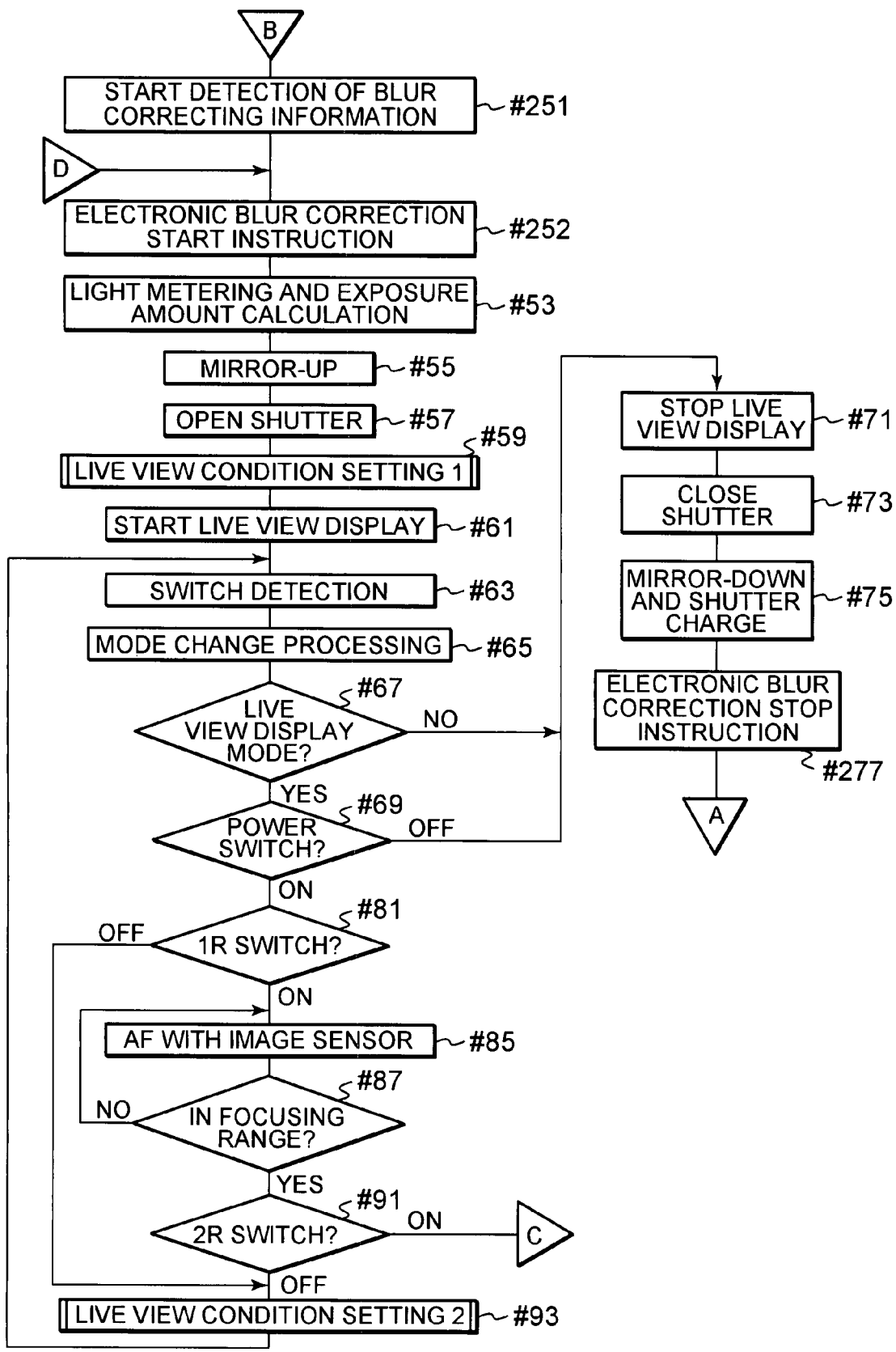
FIG. 7 is a flow chart of power-on reset according to a second embodiment of the present invention.

When a live view display mode is selected in the step #9 (FIG. 4), detection of blur correcting information is started (step #251 of FIG. 7). In this step, input of hand movement information is started from the blur correction circuit 215 via an I/O circuit 239. Subsequently, in the step #252, an instruction to start the electronic blur correction is output (#252). In the electronic blur correction, the hand movement is corrected by processing an image by the image processing circuit 227 as described above.

When the electronic blur correction start instruction is issued, an electronic blur correcting operation for reducing the hand movement is executed by processing the image with the image processing circuit 227 and the like, before a stop instruction is issued. Afterward, steps #53 to #69 are executed in the same manner as in the first embodiment, and a state of a 1R switch is detected in step #81. In a case where it is resultantly detected that the 1R switch is turned on, distance measurement (AF) is performed by a contrast process based on an output of the image pickup device 211 in the same manner as in the first embodiment (#85).

It is to be noted that in the first embodiment, the operation of the mechanical blur correction mechanism is started (#83) before executing the contrast AF, and the operation of the mechanical blur correction mechanism is stopped after the focusing (#89). However, in the second embodiment, since the electronic blur correction is started in the step #252, the blur correction with the mechanical blur correction mechanism is not especially performed.

When the processing shifts from the step #67 or #69 to step #71 of stopping live view display to enter a cancel operation of a live view display mode, processing of steps #71 to #75 is performed in the same manner as in the first embodiment, and then an instruction to stop the electronic blur correction is issued (#277). Subsequently, the processing returns to the step #3 (FIG. 4) to repeat the above-mentioned steps.

When entering the live view display mode in this manner (steps #9 to #259), the electronic blur correction is started (#252), and the electronic blur correction is executed during the live view display. When the live view display mode is canceled, the electronic blur correction is stopped (#277). In this case, auto focusing is performed in a so-called contrast process in which lenses 101, 102 are moved to a position where contrast of a subject image signal output from the image pickup device 211 is maximized (#85).

Even in the second embodiment, when the live view display is not selected, the blur correcting operation is prohibited. When the live view display is selected, the blur correcting operation is performed. Therefore, even when there is hand movement during the live view display, the hand movement is corrected by processing the image, and focal detection can precisely be performed.

Moreover, in general, the power battery is largely consumed during the blur correcting operation, but in the present embodiment, the hand movement is corrected by electronically processing the image. Therefore, the power consumption is small as compared with a case where a shift mechanism 217 is driven, and consumption of the power battery can be minimized.

Furthermore, when the 1R switch turns on during the live view display, the focused state is detected in the contrast process using the output of the image pickup device 211 to perform the focusing operation in the same manner as in the first embodiment. When the live view display is not selected and the 1R switch turns on, the focused state is detected in a phase difference process using an output of a distance measurement sensor 218 to perform the focusing operation. In either case, auto focusing is performed.

It is to be noted that a timing to start the electronic blur correction is not limited to a time when the processing enters the live view display mode as in the present embodiment, and the blur correction may be started in a case where the 1R switch turns on in the same manner as in the first embodiment, and needless to say, the correction may be stopped at a time when a photographing lens is focused.

As described in the embodiments of the present invention, a camera includes the image pickup device 211 which shoots the subject image via the photographing lens to output a subject image signal at a predetermined interval, the back surface liquid crystal monitor 26 which displays the moving image based on the subject image signal repeatedly output from this image pickup device 211, an auto focusing portion (the image pickup device 211, the lens CPU 111, the lens driving mechanism 107 and the steps #85, #87) which drives the photographing lens at a focusing position in response to an operation of half pressing the release button, and the mechanical blur correction mechanism or the electronic blur correction in which the blur correcting operation is performed based on the output of the vibration sensor 214. When the auto focusing portion executes the focusing operation during the display of the moving image in the back surface liquid crystal monitor 26, the mechanical blur correction mechanism or the electronic blur correction is operated (#83, #252). Therefore, since the blur correction is performed during the auto focusing, the focal detection can be performed precisely.

It is to be noted that in the respective embodiments, the mechanical blur correction mechanism is constituted of the blur correction circuit 215, the shift mechanism driving circuit 216, the shift mechanism 217 and the like, and the image pickup device 211 is moved based on the output of the vibration sensor 214 to remove the influence of the hand movement. However, the present invention is not limited to this embodiment, and needless to say, for example, it may be constituted that, the lenses 101, 102 and the like may be moved in a plane crossing an optical axis at right angles to remove the influence of the hand movement.

Moreover, in the respective embodiments, during the photographing of the subject image, the mechanical blur correction mechanism is operated, but the present invention is not limited to this embodiment, and the electronic blur correction may be performed. Alternatively, needless to say, a mode to prohibit the operation of the mechanical or electronic blur correction may be set.

The embodiments of the present invention have been described in accordance with the digital single lens reflex camera as an example, but the present invention is not limited to this example, and needless to say, the present invention is applicable to a compact digital camera having a blur correcting function and a live view display function, and an electronic image pickup device of a cellular phone or the like.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera configured to display a moving image, in which subject image signals are repeatedly acquired by an image pickup device to display the moving image in a display device in response to the subject image signals, the camera comprising:
   a setting portion configured to switch a mode where the moving image is displayed and a mode where the moving image is not displayed and to set the mode switched to;

a first focusing portion which performs a contrast AF operation of acquiring a contrast signal from the subject image signal to move a photographing lens to a position where a value of the contrast signal is maximized:

a second focusing portion which performs a phase-difference AF operation of detecting a defocus amount of the photographing lens to guide the photographing lens to a focusing position based on the defocus amount;

a blur correcting portion including a vibration sensor which detects vibration applied to the camera and a shift mechanism which moves the image pickup device based on an output of the vibration sensor in a plane crossing an optical axis. at right angle so as to reduce image blur generated by the vibration; and a control portion which operates the first focusing portion in response to an operation of half pressing a release button in the mode where the moving image is displayed and which operates the second focusing portion in response to the operation of half pressing the release button in the mode where the moving image is not displayed, the control portion starts the blur correcting portion in conjunction with the operation of the first focusing portion in the mode where the moving image is displayed.

2. The camera configured to display the moving image according to claim 1, wherein the control portion starts the blur correcting portion before the start of the contrast AF operation of the first focusing portion, and stops the blur correcting portion after the end of the contrast AF operation.

3. The camera configured to display the moving image according to claim 1, wherein the control portion restarts the blur correcting operation in response to an operation of fully pressing the release button.

4. The camera configured to display the moving image according to claim 1, wherein the image blur correcting portion includes a shift mechanism which moves the image pickup device in a plane crossing an optical axis at right angle based on the output of the vibration sensor.

5. The camera configured to display the moving image according to claim 1, wherein the image blur correcting portion includes an electronic image blur correcting portion which changes a position of a part cut out from the subject image signal based on the output of the vibration sensor.

6. The camera configured to display the moving image according to claim 1, wherein the image blur correcting portion starts the blur correcting operation prior to the focusing operation.

7. The camera configured to display the moving image according to claim 1, wherein the image blur correcting portion ends the blur correcting operation in response to the end of the focusing operation.

* * * * *